United States Patent [19]

Kulczycki et al.

[11] Patent Number: 4,620,621
[45] Date of Patent: Nov. 4, 1986

[54] CENTRIFUGALLY ACTIVATED ROLLER CLUTCH/OVERRUNNING CLUTCH

[75] Inventors: Elaine S. Kulczycki, Troy; Paul E. Lamarche, Utica, both of Mich.

[73] Assignee: Borg-Warner Corporation, Chicago, Ill.

[21] Appl. No.: 595,857

[22] Filed: Apr. 2, 1984

[51] Int. Cl.⁴ ............ F16D 41/20; F16D 43/14; F16D 47/04; F16D 47/06
[52] U.S. Cl. .................. 192/3.31; 192/38; 192/44; 192/45; 192/48.92; 192/105 BA; 192/106.2
[58] Field of Search .......... 192/3.28, 3.31, 30 V, 192/38, 44, 45, 103 B, 105 BA, 106.2, 48.92, 41 A

[56] References Cited

U.S. PATENT DOCUMENTS

| | | | |
|---|---|---|---|
| 455,009 | 6/1891 | Shoudy | 192/45 X |
| 1,357,769 | 11/1920 | Fuchs | 192/105 BA |
| 2,051,794 | 8/1936 | Connors | 192/105 BA X |
| 2,644,535 | 7/1953 | Koup et al. | 192/3.31 |
| 3,306,410 | 2/1967 | Hare | 192/105 BA |
| 3,414,096 | 12/1968 | Reed | 192/38 |
| 3,437,186 | 4/1969 | Roper | 192/35 |
| 3,476,226 | 11/1969 | Massey | 192/27 |
| 3,519,112 | 7/1970 | Verzolla | 192/3.31 |
| 3,675,750 | 7/1972 | Wright | 192/105 BA |
| 3,767,019 | 10/1973 | Wingler | 192/45 |
| 3,948,372 | 4/1976 | Hare | 192/105 BA |
| 4,042,083 | 8/1977 | Schulz | 192/3.31 |
| 4,117,918 | 10/1978 | Silberschlag | 192/3.31 X |
| 4,140,208 | 2/1979 | Clauss et al. | 192/3.31 |
| 4,140,210 | 2/1979 | Schulz | 192/3.31 X |
| 4,212,557 | 7/1980 | Overbeck | 192/44 X |
| 4,222,472 | 9/1980 | Telford | 192/36 |
| 4,274,524 | 6/1981 | Nakane | 192/70.17 X |
| 4,383,596 | 5/1983 | Jackel | 192/105 BA X |
| 4,413,711 | 11/1983 | Lamarche | 192/3.28 |
| 4,430,064 | 2/1984 | Lamarche | 192/106.2 X |
| 4,451,244 | 5/1984 | Lamarche | 192/106.2 X |
| 4,462,490 | 7/1984 | Hattori | 192/45 |

FOREIGN PATENT DOCUMENTS

| | | | |
|---|---|---|---|
| 1150845 | 6/1963 | Fed. Rep. of Germany | 192/45 |
| 2144665 | 3/1973 | Fed. Rep. of Germany | 192/41 A |

*Primary Examiner*—Rodney H. Bonck
*Attorney, Agent, or Firm*—James A. Geppert

[57] ABSTRACT

A centrifugally-actuated roller clutch or overrunning clutch acting to engage two shafts rotating independently at different speeds to bring them into engagement in one or both directions at a predetermined rpm. The clutch assembly includes an outer race, a wave hub or inner race, clutch rollers, a spacer ring or spacer blocks to separate the rollers and a garter spring encompassing the rollers. If a freewheeling mode is required in one direction, the spacer ring or blocks are not required, and the wave form of the inner hub controls the overrunning action.

9 Claims, 16 Drawing Figures

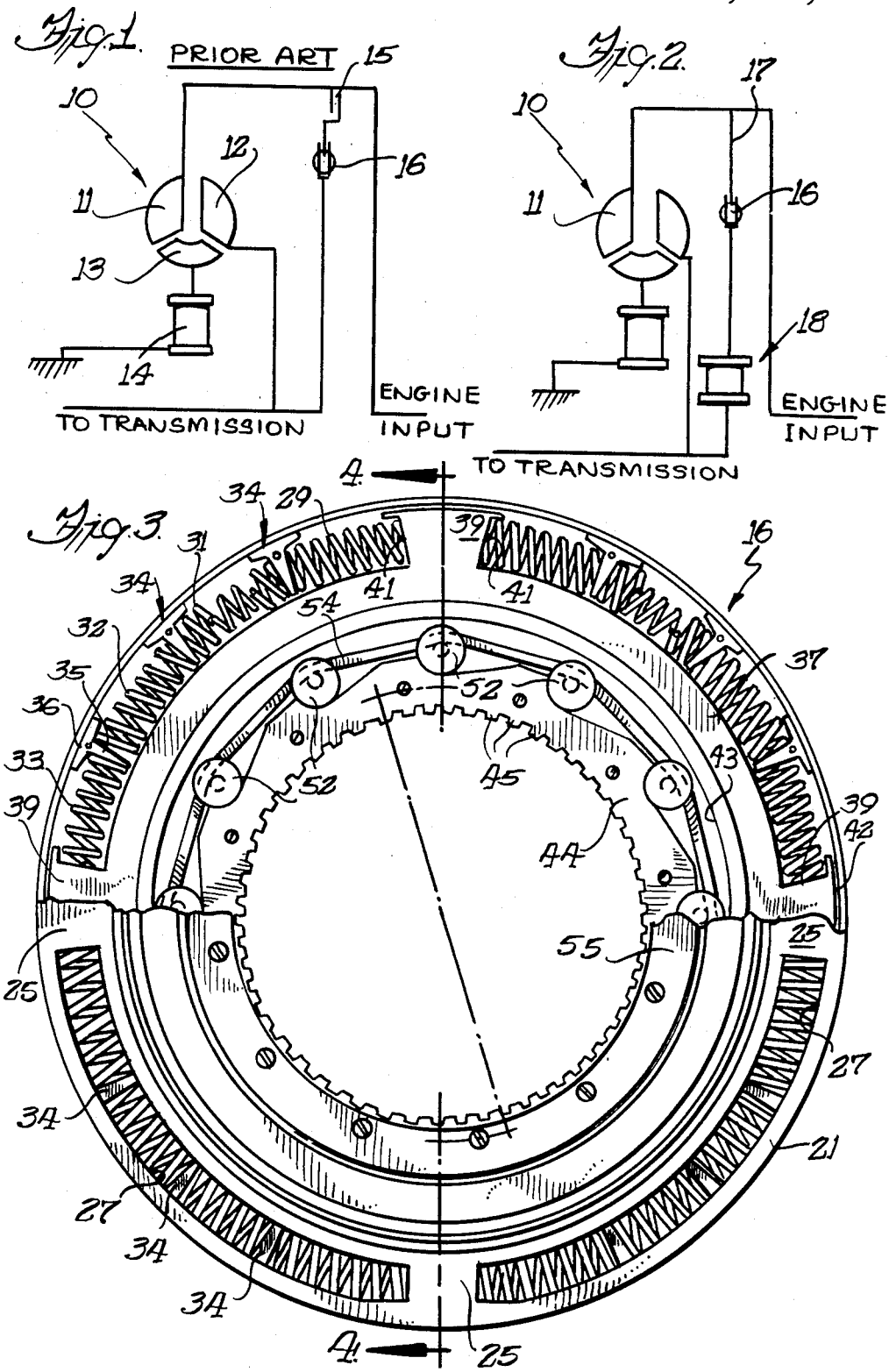

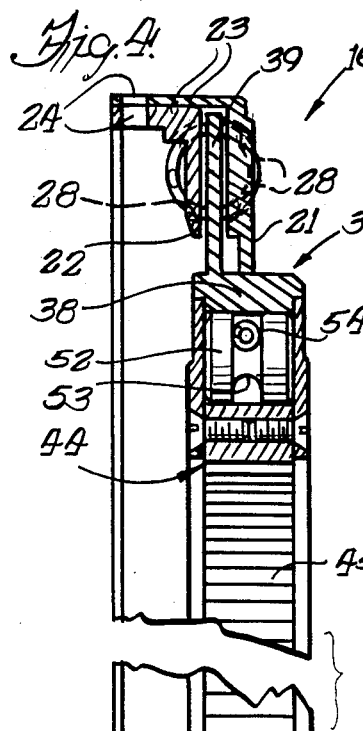
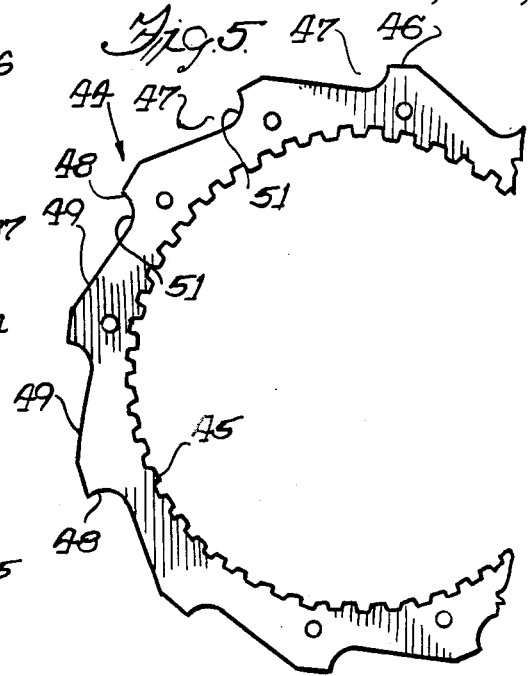
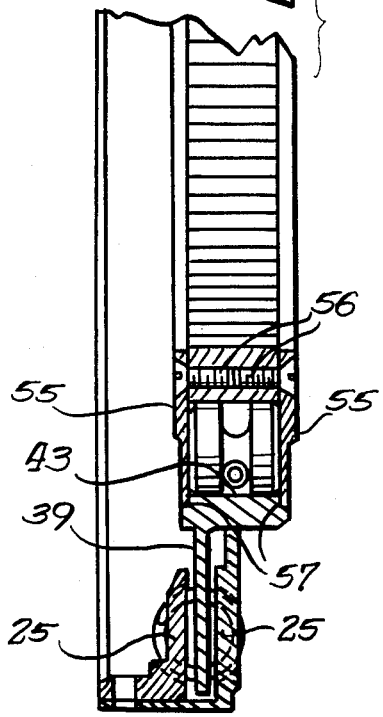
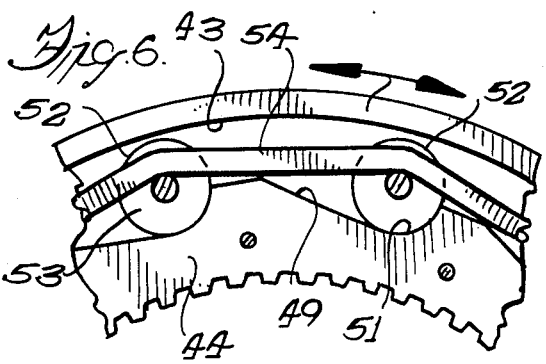
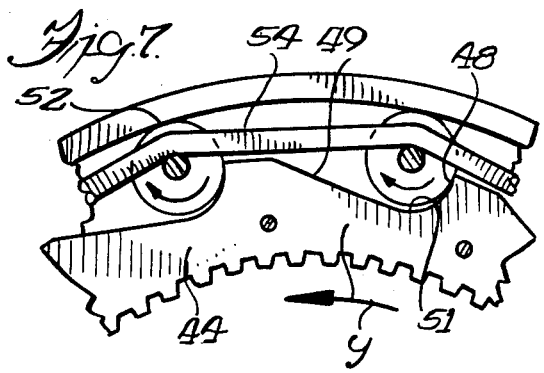

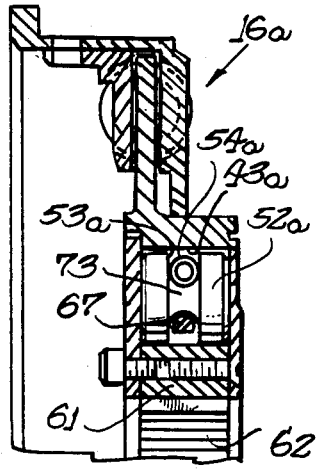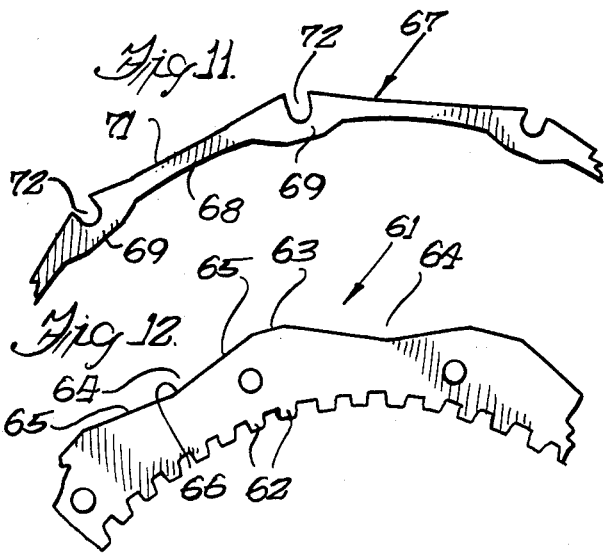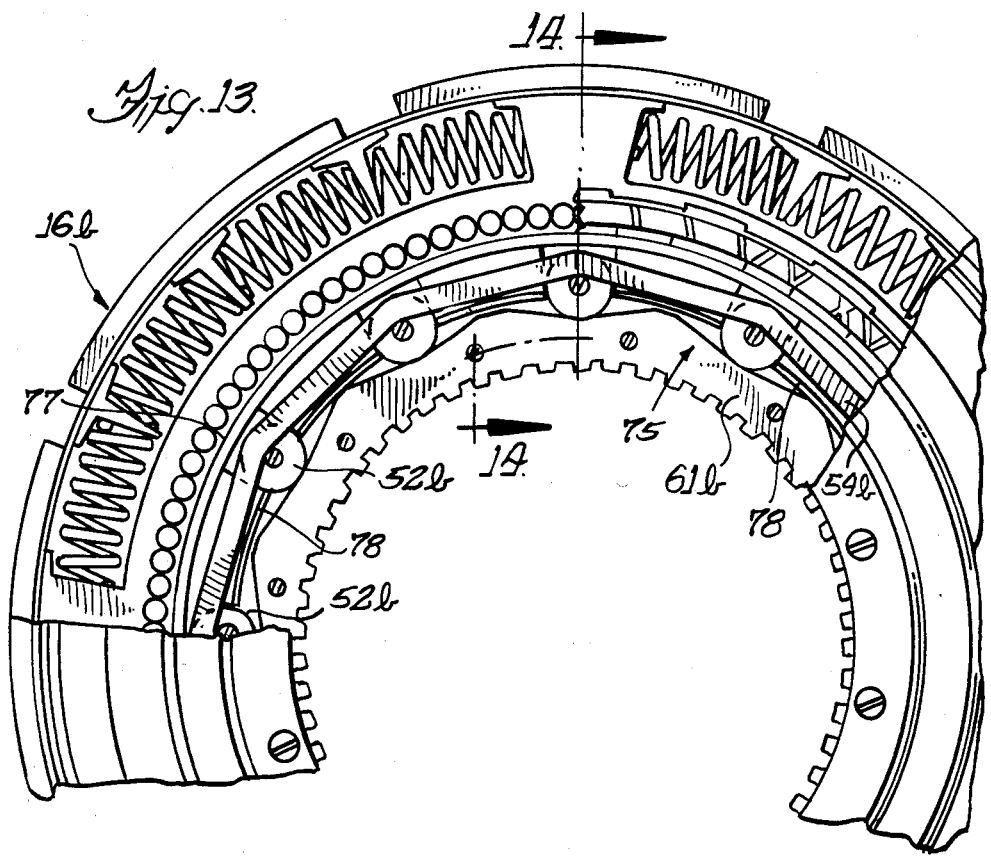

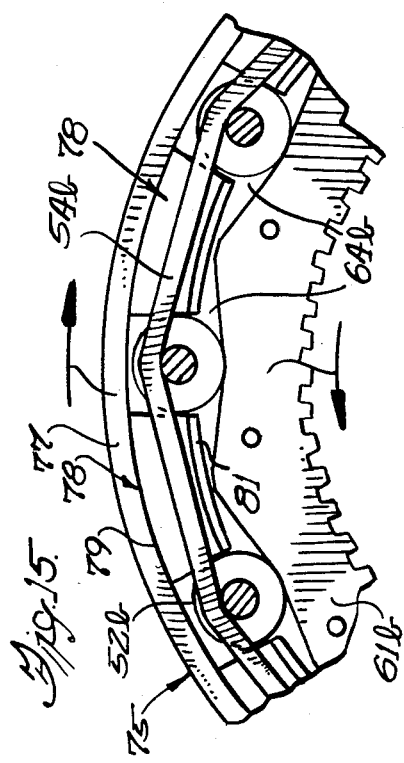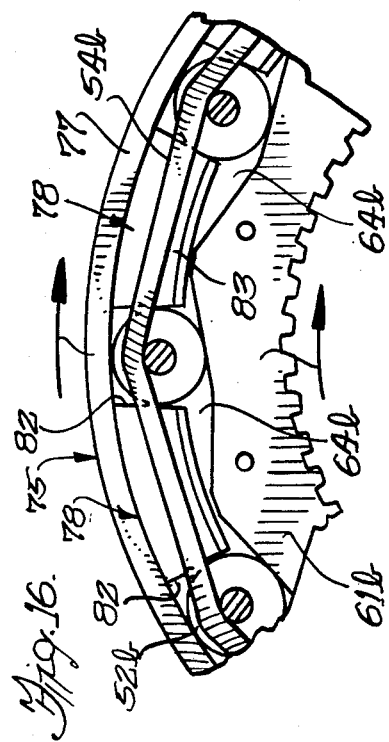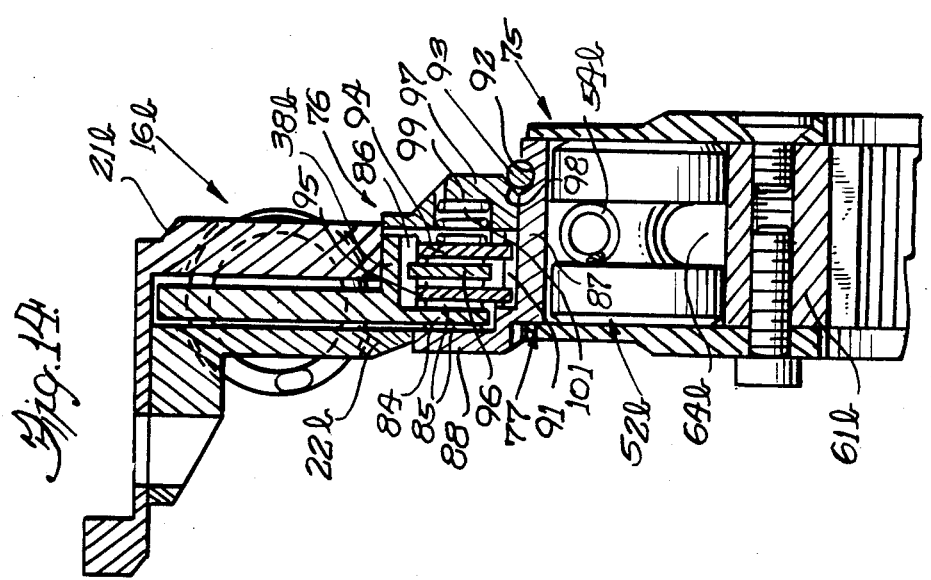

CENTRIFUGALLY ACTIVATED ROLLER CLUTCH/OVERRUNNING CLUTCH

BACKGROUND OF THE INVENTION

Four conventional methods of clutch actuation comprise mechanical, pneumatic, electrical and hydraulic actuation. All of these various modes have disadvantages in clutch or operator actuation. Specifically, mechanical actuation requires hand or foot actuation to apply a lever which in turn activates the clutch pressure plate. This type of actuation limits torque and power transmission; especially hand operation where clamping force, torque, response and cycling times are also limited. Also, there may be high frictional losses in the linkage or cable leading to the clutch actuation fork.

Pneumatic and hydraulic actuated clutches require expensive suport equipment such as piping and valves for actuation of a piston. Most electric clutches run dry and do not have high thermal capacities. Thus, they may perform erratically at the high temperatures that may occur in the clutch environment. Also, centrifugally actuated clutches require complex friction shoe configurations with a spring arrangement to either limit the time of engagement and/or retract the friction shoes upon deceleration. The present invention relates to a centrifugal roller clutch which obviates many of the above-enumerated disadvantages.

SUMMARY OF THE INVENTION

The present invention comprehends the provision of a novel centrifugally actuated roller clutch and/or overrunning clutch that is extremely simple, inexpensive and durable. The clutch includes an outer race, an inner wave hub, a plurality of rollers, spacing means separating the rollers to prevent premature lock-up, and a garter spring acting to yieldably bias the rollers against centrifugal force resulting from rotation of the assembly. This clutch requires few parts for easy manufacturability, assembly and maintenance and works with large design tolerances.

The present invention also comprehends the provision of a novel centrifugally actuated roller clutch having little power loss and no frictional losses due to cables and levers. There is little wear on the rollers and outer race due to infinite contact areas, and there is no need for a ground surface and tight dimensional control. This clutch works equally well wet or dry.

The present invention further comprehends the provision of a novel centrifugally actuated roller clutch having a fast response time due to the locking action between the outer race and wave hub ramp and has the ability to consistently engage two shafts at a predetermined rpm. The clutch allows engagement clockwise and counterclockwise or in one direction only by simply changing wave hubs.

It is also comprehended that the present invention provide a centrifugally actuated roller clutch that can be utilized in conjunction with a torsional vibration damper in the torque converter of an automotive vehicle.

Further objects are to provide a construction of maximum simplicity, efficiency, economy and ease of assembly and operation, and such further objects, advantages and capabilities as will later more fully appear and are inherently possessed thereby.

DESCRIPTION OF THE DRAWINGS

FIG. 1 is a schematic showing of a presently utilized lock-up clutch and vibration damper assembly in a vehicle torque converter.

FIG. 2 is a schematic showing of the centrifugal roller clutch and vibration damper of the present invention in the torque converter.

FIG. 3 is a rear elevational view with portions broken away of the centrifugal roller clutch and vibration damper of the present invention.

FIG. 4 is a cross sectional view of the assembly taken on the irregular line 4—4 of FIG. 3.

FIG. 5 is a partial front elevational view of the inner race of the centrifugal roller clutch.

FIG. 6 is a partial front elevational view of the roller clutch in inactive position.

FIG. 7 is a partial elevational view similar to FIG. 6, but showing the clutch action in the overrunning mode.

FIG. 10 is a partial cross sectional view taken on the irregular line 10—10 of FIG. 9.

FIG. 11 is a partial elevational view of a spacer ring used in the roller clutch.

FIG. 12 is a partial elevational view of the two-way inner race configuration.

FIG. 13 is a partial rear elevational view of an alternate form of vibration damper with a two-way roller clutch therein.

FIG. 14 is an enlarged partial cross sectional view taken on the irregular line 14—14 of FIG. 13.

FIG. 15 is a partial elevational view of the the roller clutch in inactive position.

FIG. 16 is a partial elevational view similar to FIG. 15 but with the clutch in engaged position.

DESCRIPTION OF THE PREFERRED EMBODIMENTS

Figure 8:
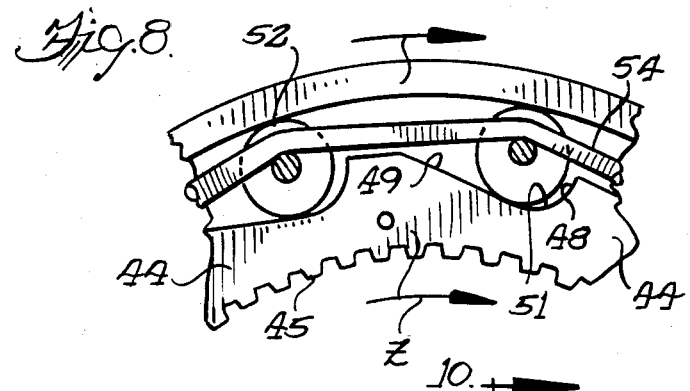
FIG. 8 is a partial front elevational view similar to FIG. 6 but showing the roller clutch in its engaged position.

Referring more particularly to the disclosure in the drawings wherein are shown illustrative embodiments of the present invention, FIG. 1 discloses a schematic showing of a presently utilized lock-up clutch and vibration damper for a torque converter 10 having an impeller 11 driven by the engine input, a turbine 12 rotating due to fluid circulating from the impeller, and a stator 13 mounted on a one-way clutch 14 as is conventionally used. A lock-up clutch 15 has a piston plate acting under hydraulic pressure to engage the torque coverter housing at a predetermined speed to lock the impeller and turbine in an essentially direct drive arrangement; a vibration damper 16 being located between the piston plate and torque output to cushion engine impulses and other vibration, with the damper being connected to the turbine hub which in turn is operatively connected to the transmission input shaft.

The present invention is schematically shown in FIG. 2 in conjunction with the torque converter 10 of FIG. 1. In this version, the input 17 of the vibration damper 16 is directly connected to the torque converter impeller 11 and housing, and a centrifugally-actuated roller clutch and/or overrunning clutch 18 is interposed between the damper output and the turbine hub.

As more specifically shown in FIGS. 3 through 8, the vibration damper 16 comprises a pair of retainer plates 21 and 22, each having a mounting flange 23 with aligned openings 24 for suitable securing means, such as bolts, to secure the plates to the torque converter shell (not shown). Each plate is generally annular and has a plurality of circumferentially equally spaced drive straps 25 separating arcuate slots 27 formed therein with chamferred edges 28 acting to receive and retain sets of damper springs 29, 31, 32 and 33. Separating the spring sets are independently slidable spring separators or skates 34, each skate having a wedge-like body 35 and an arcuate outer edge 36 forming circumferentially oppositely extending fingers.

A hub member 37 includes an annular barrel or body portion 38 with circumferentially spaced radially extending hub arms 39, each having diverging edges 41 and an arcuate outer edge 42; each hub arm having the same general shape as and normally axially aligned with the drive straps 25 on the retainer plates. The hub arms 39, drive straps 25, and spring separators 34 are all in the path of the spring sets, with the plates 21 and 22 acting to retain the spring sets within the damper assembly.

The inner cylindrical surface 43 of the hub barrel 38 also acts as the outer race for the roller clutch 18. The inner race for the clutch is formed on a generally annular wave hlub 44 having an inner splined surface 45 defining a central opening receiving a shaft or gear (not shown) in communication with the transmission input shaft that is also operatively connected to the hub for the turbine 12. The exterior surface of the wave hub includes a cylindrical surface 46 interrupted by a plurality of circumferentially spaced pockets 47, each pocket including a substantially radially extending surface 48 and an inclined surface or ramp 49 intersecting at a rounded bottom surface 51; the surface 49 being inclined at an acute angle to a tangent contacting the cylindrical surface 46 adjacent the surface 49. The rounded portion 51 merging into the surface 48 has a diameter substantially equal to the outer diameter of a clutch roller 52 received therein.

Each roller 52 is received in a corresponding pocket 51 and has a central groove 53 of a width to receive a garter spring 54 extending circumferentially around and resiliently urging the rollers 52 into their respective pockets; the pockets acting to space the rollers apart. A pair of hub plate 55,55 are located on opposite sides of the wave hub 44 and are secured thereto by bolts or screws 56; the peripheries of the plates being received in counterbores 57 in the opposite ends of the hub barrel 38. The plates retain the rollers 52 and hubs 37 and 44 in operative engagement.

As seen in FIGS. 6, 7 and 8, the rollers 52 act as a centrifugal clutch or overrunning clutch depending the direction of rotation of the races. In FIG. 6, the wave-hub 44 is below engagement rpm and, in either direction of rotation of wave-hub 44, the ouer race in hub barrel 38 is not engaged, as the garter spring 54 urges the rollers 52 into the pockets 51 away from surface 43. Thus, the hub barrel 38 is free to freewheel in either direction. As the wave-hub reaches engagement rpm due to rotation of the turbine in the torque converter, the rollers 52 are thrown outward due to centrifugal force against the garter spring to ride on the outer race surface 43.

As seen in FIG. 7, if the wave hub 44 rotates in the direction of arrow "Y", the lack of wedging action permits the rollers 52 to freewheel between the races; the rollers having moved outward on the generally radial surfaces 48 of the pockets 47. However, if engagement rpm is reached and the wave hub rotates in the direction of arrow "Z" (FIG. 8), the rollers 52 ride up on the inclined surfaces 49 and lock up between the outer race surface 43 and wave hub ramps 49 due to wedging action. Now wave hub 44 and the outer race 43 are in engagement in the directon "Z". This results in a direct drive between the impeller and turbine of the torque converter in the same manner as the lock-up clutch 15 in FIG. 1. Therefore, upon acceleration of the impeller and consequently the turbine by the vehicle engine, the torque converter will be locked up by the roller clutch in the drive direction, but in the coast direction the roller clutch will freewheel or overrun.

Figure 9:
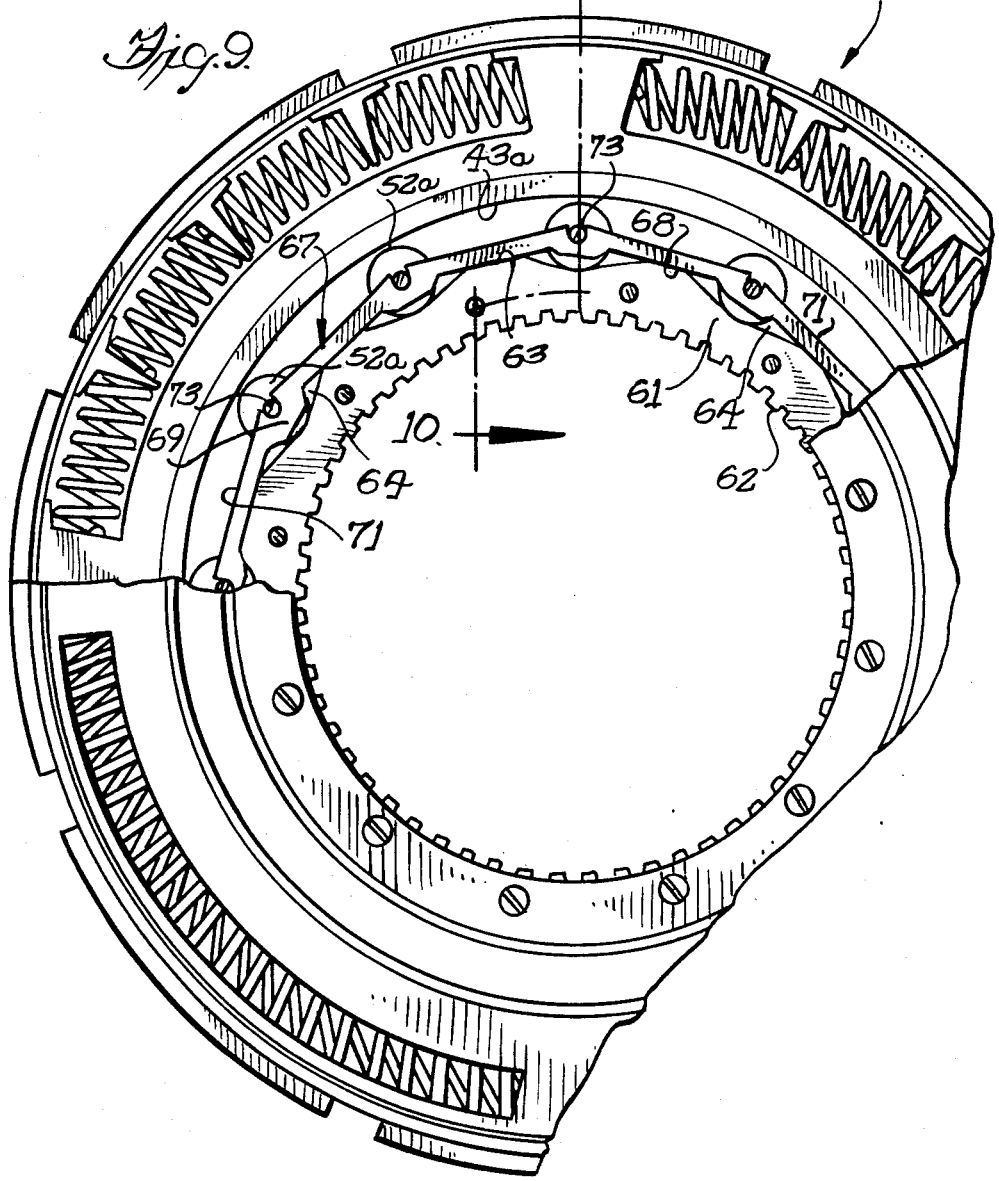
FIG. 9 is a partial rear elevational view with parts broken away of the damper assembly with a two-way roller clutch.

If it is desired that the roller clutch 18a lock up in both directions of rotation, then a different configuration of wave hub 61 is utilized in the roller clutch as shown in FIGS. 9 through 12. The vibration damper 16a is substantially identical to that shown in FIGS. 3 through 8 including a cylindrical outer race 43a for the roller clutch. As seen in FIGS. 9 and 12, a two-way wave hub 61 has an internally splined central opening 62 and an outer cylindrical surface 63 interrupted by a plurality of circumferentially spaced pockets 64; each pocket including a pair of oppositely extending inclined surfaces of wedging ramps 65,65 intersecting at a V-shaped base 66.

Located intermediate the ends of the wave hub is a generally annular spacer ring 67 for locating and guiding the clutch rollers 52a in the assembly and preventing premature lock-up of the clutch. The ring includes a generally cylindrical inner circumference 68 having circumferentially spaced inward projections 69 generally radially aligned with the pockets 64 and a generally polygonal periphery 71. Opposite each projection 69, the periphery is formed with an outwardly opening U-shaped notch 72 receiving the reduced diameter axle 73 formed by the central annular groove 53a of each roller 52a; the notches allowing the rollers to move radially outwardly under centrifugal force. Also, a garter spring 54a is received in the grooves 53a radially outwardly of the axles 73 to urge the rollers inwardly into the pockets in the wave hub.

This clutch assembly operates in a similar manner to that described for the embodiment of FIGS. 1 through 8, except that the rollers will lock up in either direction of rotation of the wave hub. When engagement rpm is reached, the rollers 52a move outwardly under centrifugal force to wedge between one of the two ramps 65, depending on the direction of rotation, and the outer race 43a and lock the inner and outer races together to by-pass the torque converter.

FIGS. 13 through 16 disclose a third embodiment of lock-up clutch 75 including a slipping clutch 76 between the damper 16b and the roller clutch. The roller clutch 75 is similar to that shown in FIGS. 9 through 12 with the two-way wave hub 61b, the rollers 52b received in the pockets 64b and an outer race 77. A plurality of separate spacer blocks 78 have been substituted for the spacer ring of the previous embodiment to prevent premature engagement of the rollers, each block having an arcuate outer surface 79, an arcuate inner surface 81, and outwardly diverging edges 82,82, with the edges of adjacent blocks forming a channel to guide movement of the rollers 52b. Each spacer block is independent of the races and clutch rollers and has a central circumferential groove or channel 83 receiving the garter spring 54b biasing the rollers inwardly.

The vibration damper 16b includes a hub barrel 38b having a radial inwardly extending flange 84 at one end of the barrel acting as a clutch plate with oppositely disposed friction surfaces 85,85 thereon. The hub barrel 38b includes a plurality of circumferentially spaced axially extending internal ribs or splines 86 therein. The outer race 77 includes a barrel 87 having a radial outwardly extending flange 88 adjacent to but outside of the flange 84 and received in an opening defined by the inner periphery of the damper retainer plate 22b; the flange acting as a back-up plate. Exterior circumferentially spaced axial ribs or splines 91 and an annular groove 92 are formd on the barrel 87 with the groove receiving a stop ring 93 adjacent the end of the barrel opposite flange 88.

A pair of annular friction plates or discs 94,95 having interior grooves receiving the splines 91 sandwich an annular friction plate or disc 96 having exterior grooves receiving the splines 86; at least the disc 96 having friction surfaces on the opposite sides thereof. An annular spring retainer plate 97 has an internal diameter conformably receiving the barrel 87 and an outer diameter received in the opening defined by retainer plate 21b; a chamfered inner edge 98 being engaged by the stop ring 93 to retain the plate 97 in operative position. The plate includes a plurality of circumferentially spaced inwardly opening spring pockets 99 receiving compression springs 101 which extend out of their pockets to abut the friction plate 94 and yieldably urge the friction plates 94, 95, 96 together and into engagement with the hub flange 84 and barrel flange 88 to provide the slipping clutch 76.

This assembly operates in the same manner as the assembly of FIGS. 9 through 12, except that the slipping clutch 76 provides a fixed torque capacity clutch located in series in the mechanical path, which clutch slips when axle torque spikes exceed a predetermined limit. Obviously, the spacer ring 67 of FIG. 11 and the spacer blocks 78 of FIG. 13 are interchangeable in the assemblies utilizing the two-way wave hub and the one-way hub may be used in the vibration damper including the slipping clutch 76.

We claim:

1. A centrifugally-actuated roller cluton comprising an outer race having a smooth, cylindrical interior surface, an inner race comprising a two-way wave hub for locking of the races in both directions of rotation and having a plurality of circumferentially spaced pockets in the exterior surface thereof, each pocket having a pair of oppositely extending inclined intersecting ramps, a plurality of clutch rollers received in said pockets, each of said rollers including a central annular channel therein defining a reduced diameter axle, a garter spring received in the channels of said rollers urging the rollers inwardly into said pockets, and a spacer ring encompassing the wave hub and received in the channels of said rollers, said ring having a plurality of circumferentially spaced outwardly opening notches receiving the axles of said rollers to separate the clutch rollers and locate them in said hub pockets.

2. A centrifugally-actuated roller clutch as set forth in claim 1, in which said spacer ring has an inwardly extending projection opposite each notch and generally aligned with a wave hub pocket.

3. A vibration damper assembly for a torque converter in an automotive vehicle or the like, comprising a damper housing operatively connected to torque input means and a hub operatively connected to torque output means, said housing including a pair of generally parallel annular plates having circumferentially spaced drive straps with arcuate slots extending therebetween, the hub comprising a hub barrel and radially extending hub arms on said hub barrel extending between said annular plates, a plurality of floating dividers between adjacent hub arms, damper springs within said housing between said hub arms and dividers, a centrifugally-actuated roller clutch between said hub barrel and said torque output means, said clutch including a wave hub connected to said torque output means, said wave hub having a plurality of circumferentially spaced pockets on the periphery thereof, a clutch roller received in each pocket, and a garter spring yieldably urging the rollers into said pockets, each pocket having at least one inclined ramp for wedging engagement with the associated clutch roller, and a slipping clutch between said damper hub and said roller clutch, said slipping clutch comprising an intermediate hub barrel forming an outer race of said roller clutch, a reaction flange extending inwardly from said damper hub barrel, the interior surface of said damper hub barrel having circumferentially spaced splines, the exterior surface of said intermediate hub barrel having circumferentially spaced splines thereon, interleaved friction plates operatively connected alternately to said damper hub barrel and intermediate hub barrel, and resilient means urging said fricion plates into engagement with said reaction flange.

4. A vibration damper assembly as set forth in claim 3, in which a spring retainer plate is connected to said intermediate hub barrel, and said resilient means comprises a plurality of compression springs bearing against the spring retainer plate and adjacent friction plate.

5. A vibration damper assembly for a torque converter in an automotive vehicle or the like, comprising a damper housing operatively connected to torque input means and a hub operatively connected to torque output means, said housing including a pair of generally parallel annular plates having circumferentially spaced drive straps with arcuate slots extending therebetween, the hub comprising a hub barrel having a cylindrical interior surface and radially extending hub arms on said hub barrel extending between said annular plates, a plurality of floating dividers between adjacent hub arms, damper springs within said housing between said hub arms and and dividers, and a centrifugally-actuated lock-up clutch between said hub barrel forming an outer race therefor and said torque output means, said clutch including a two-way wave hub connected to said torque output means and having a plurality of circumferentially spaced pockets on the periphery thereof forming an inner race with each pocket having a pair of oppositely inclined intersecting wedging ramps, a clutch roller received in each pocket and having a central annular groove, and a garter spring received in said grooves and yieldably urging the rollers into said pockets for wedging engagement with said inclined ramps.

6. A vibration damper assembly as set forth in claim 5, including spacing means for said clutch rollers.

7. A vibration damper assembly as set forth in claim 6, wherein said spacing means comprises an independent spacer block between adjacent clutch rollers.

8. A vibration damper assembly as set forth in claim 7, wherein each spacer block has arcuate inner and outer surfaces, outwardly diverging end edges, and a longitudinally extending channel therethrough receiving the garter spring.

9. A vibration damper assembly for a torque converter in an automotive vehicle or the like, comprising a damper housing operatively connected to torque input means and a hub operatively connected to torque output means, said housing including a pair of generally parallel annular plates having circumferentially spaced drive straps with arcuate slots extending therebetween, the hub comprising a hub barrel and radially extending hub arms on said hub barrel extending between said annular plates, a plurality of floating dividers between adjacent hub arms, damper springs within said housing between said hub arms and dividers, and a centrifugally-actuated lock-up clutch between said hub barrel and said torque output means, said clutch including a two-way wave hub connected to said torque output means and having a plurality of circumferentially spaced pockets on the periphery thereof, each pocket having a pair of oppositely inclined intersecting wedging ramps, a clutch roller received in each pocket and having a central annular groove, a generally circular spacer ring having spaced outwardly opening notches receiving said clutch rollers with said ring received in the roller grooves, and a garter spring received in said grooves yieldably urging the rollers into said pockets.

* * * * *